Figure 1:
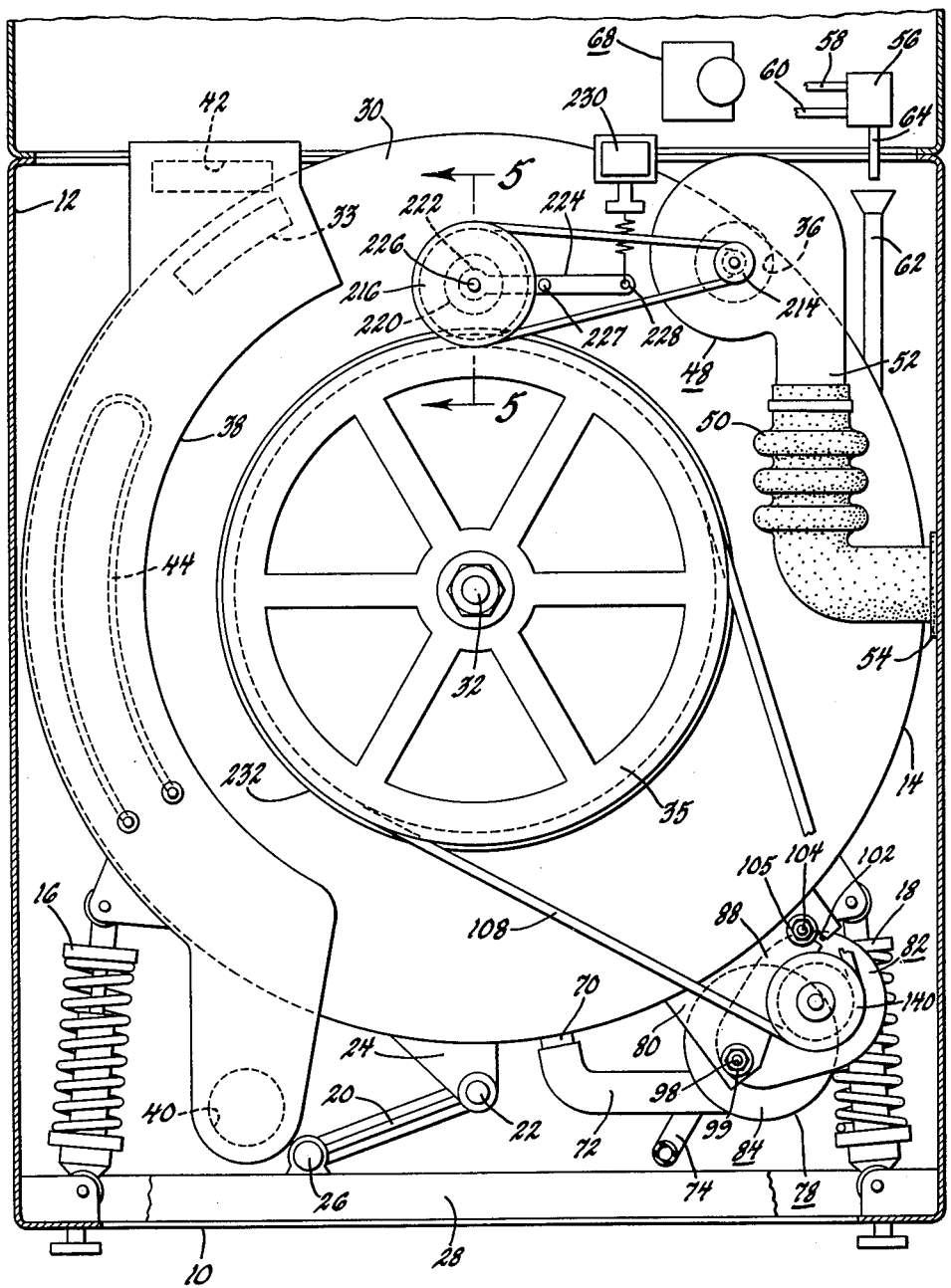

INVENTOR.
Marvin O. Ross
BY
Frederick M. Ritchie
HIS ATTORNEY

Nov. 30, 1965     M. O. ROSS     3,220,120
DOMESTIC APPLIANCE
Original Filed Nov. 18, 1960     3 Sheets-Sheet 2
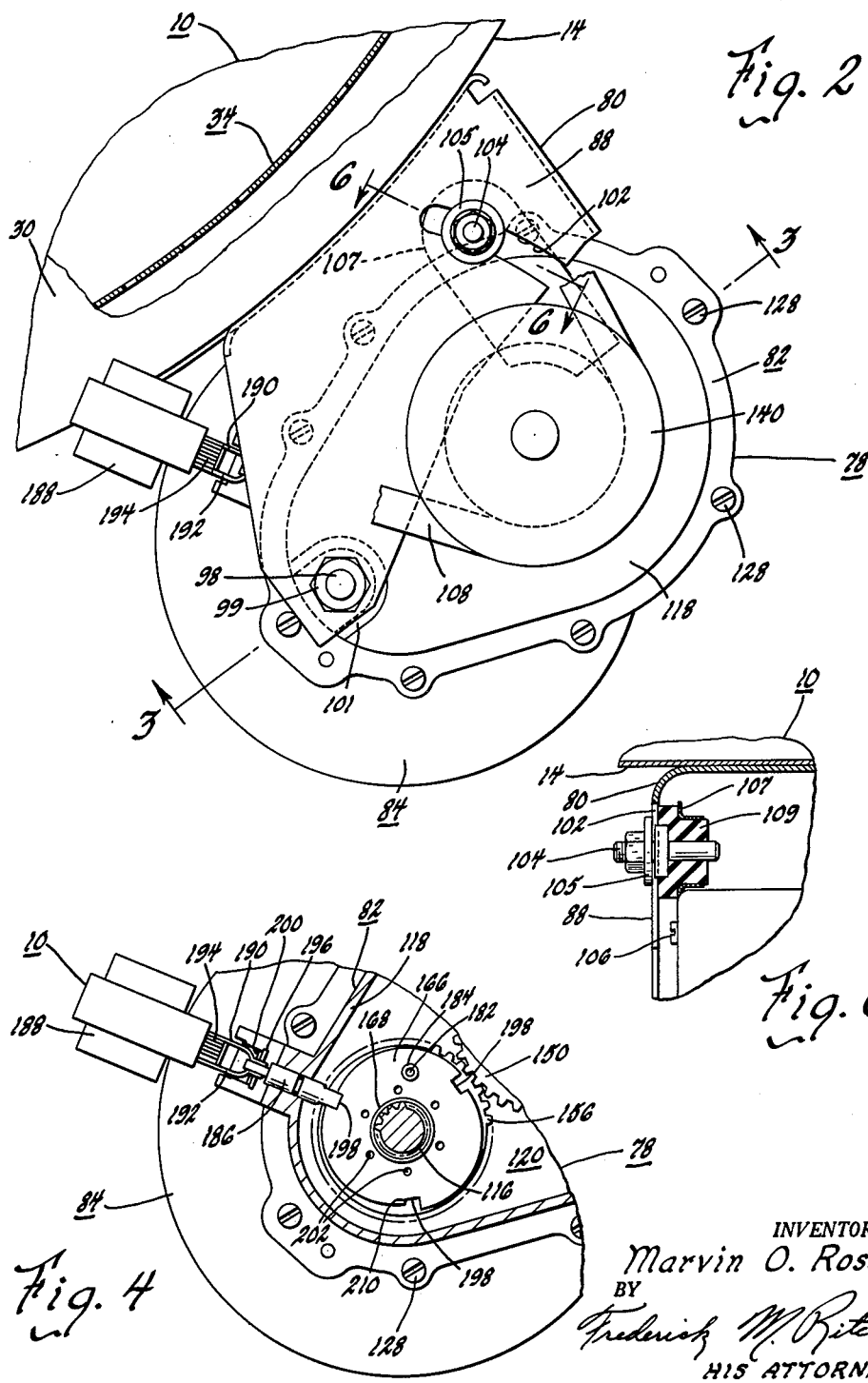
INVENTOR.
Marvin O. Ross
BY
Frederick M. Ritchie
HIS ATTORNEY

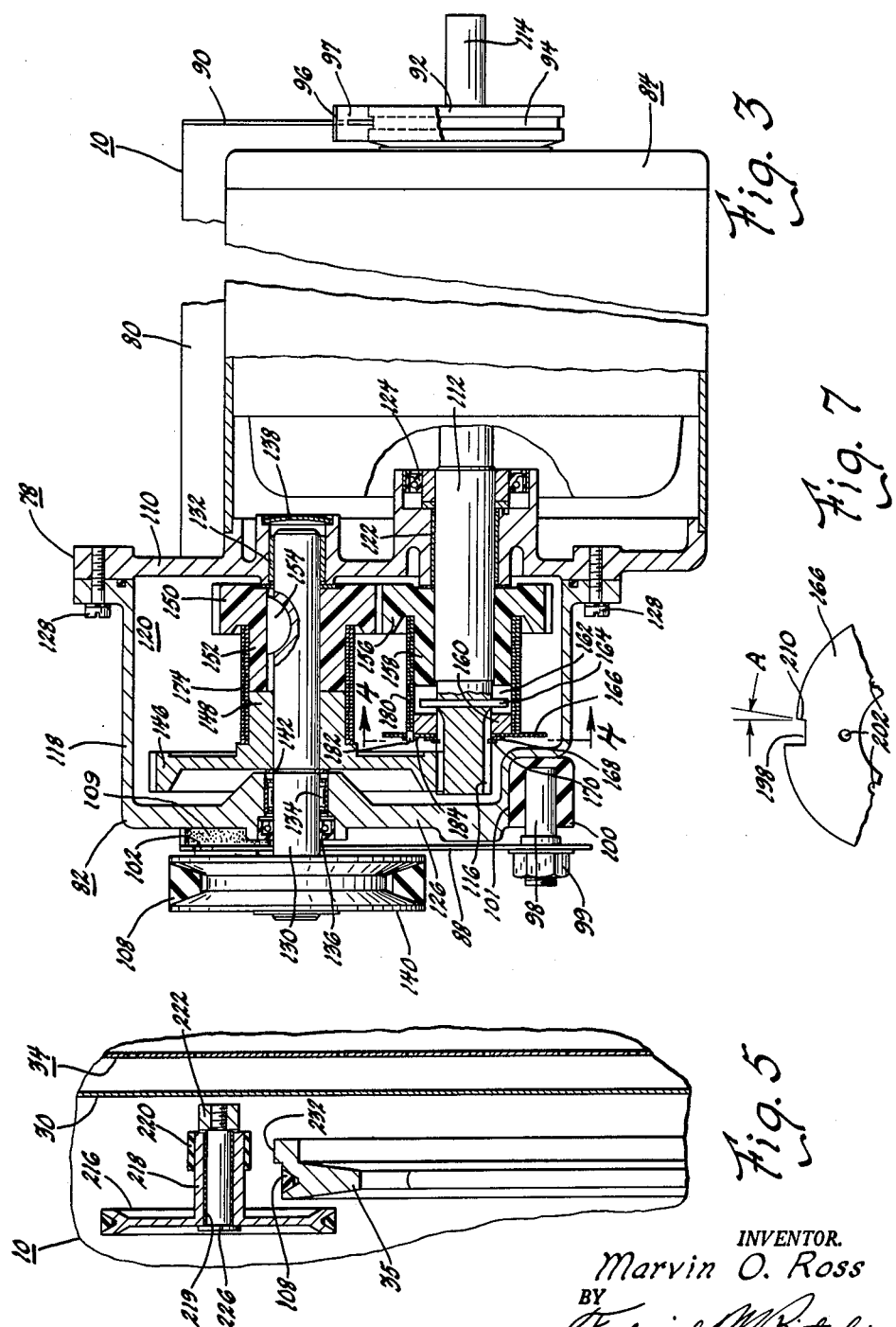

United States Patent Office 3,220,120
Patented Nov. 30, 1965

3,220,120
DOMESTIC APPLIANCE
Marvin O. Ross, Dayton, Ohio, assignor to General Motors Corporation, Detroit, Mich., a corporation of Delaware
Original application Nov. 18, 1960, Ser. No. 70,260, now Patent No. 3,087,351, dated Apr. 30, 1963. Divided and this application Sept. 26, 1962, Ser. No. 226,402
2 Claims. (Cl. 34—133)

This invention is a division of my copending application Serial No. 70,260, filed November 18, 1960, now Patent No. 3,087,351, and relates to a domestic appliance and more particularly to an improved power transmission therefor.

In the laundry appliance art many prime mover systems utilize L.G.S. spring clutches for selectively transmitting power through a speed reducing transmission. Such a spring clutch functions in response to the relative rotation of parts with which the spring clutch is engaged so long as the parts move with the desired relative rotation the spring clutches tighten and relax and are very effective in selectively transmitting power. However, certain laundry appliances utilize horizontal tumbling drums in which the clothes are tumbled about the horizontal axis of the drum. Generally, the clothes are tumbled at a low speed r.p.m. during the washing and fluffing operation and are rotated at a high speed r.p.m. to centrifuge the water from the clothes during a spin dry cycle. Where the appliance involved is a combination washer-dryer, the centrifuging portion of the cycle is terminated with the clothes in a damp dry condition. This mass of damp fabric, if off-center in the drum, will operate in accordance with gravity to seek its lowest level. After the machine is stopped, it can be seen under certain circumstances that a soggy mass of clothes could reverse the normal forward rotation of the tumbling drum, thereby setting up reverse relative rotation among the transmission parts to adversely effect the desired operation of the spring clutches.

Accordingly, it is an object of this invention to provide a power transmission for a combination washer-dryer with means for preventing undesired lock-up of spring clutches in the transmission.

More particularly, it is an object of this invention to provide a power transmission with a selectively insertable pin for engaging a ratchet member attached to a spring clutch for conditioning the transmission for either low speed or high speed.

A more specific object of this invention is the provision of a selectively insertable pin in conjunction with a power transmission cam which includes a notch for cooperating with said pin to prevent inadvertent locking of a spring clutch.

Another object of this invention is to provide an air impeller system for a laundry appliance which includes a power take-off from the rotating drum pulley.

More particularly, it is an object of this invention to provide a power take-off arrangement including a drum pulley having a radially outwardly disposed ramp and a blower drive pulley selectively pivotally engageable with said ramp.

It is also an object of this invention to provide an improved adjustable prime mover mounting arrangement for a horizontal drum laundry appliance.

Further objects and advantages of the present invention will be apparent from the following description, reference being had to the accompanying drawings wherein preferred embodiments of the present invention are clearly shown.

In the drawings:
FIGURE 1 is a fragmentary rear sectional view, partially in elevation, of a combination washer-dryer provided with this invention;
FIGURE 2 is a fragmetnary elevational view with parts broken away to show the mounting arrangement by which the power transmission of this invention is attached to a combination washer-dryer;
FIGURE 3 is a fragmentary sectional view partially in elevation of the power transmission of this inveniton taken along line 3—3 in FIGURE 2;
FIGURE 4 is a fragmentary sectional view taken along line 4—4 in FIGURE 3;
FIGURE 5 is a fragmentary sectional view taken along line 5—5 in FIGURE 1; and
FIGURE 6 is a fragmentary sectional view taken along line 6—6 in FIGURE 2; and
FIGURE 7 is a fragmentary elevational view of the anti-back up cam of this invention.

Referring now to FIGURE 1 a combination washer-dryer appliance 10 is provided with this invention. The appliance includes an outer casing or cabinet 12 which encloses a generally cylindrical water container 14. The water container 14 is generally imperforate except for an access opening (not shown) and a drying air flow inlet and outlet, to be described hereinafter. The water container is movably mounted within the cabinet 12 on a pair of shock absorbers 16 and 18 and stabilized by a torque arm 20 which is pivotally secured at 22 to a bracket 24 attached to the water containers and at 26 to the base 28 of the cabinet 12. Thus, whenever any unbalanced condition exists within the water container 14, the water container may rock within the cabinet—the motion being taken up in the shock absorbers 16 and 18 and stabilized by the torque arm 20. The water container 14 is provided with a back wall 30 which serves to rotatably support or journal a shaft 32 which extends through the back wall of the water container to rotatably support a perforated cylindrical tumbling drum 34 (FIGURE 2). On the outside of the water container a drum pulley 35 is affixed to the tumbling drum shaft 32 so that the drum may be driveably connected to a remote prime mover shown generally at 78.

Since this appliance is a combination washer-dryer it is necessary to provide a system of air flow through the tumbling drum as an aid in the drying cycle portion of the laundry operation. For this purpose the rear wall 30 of the water container is provided with an inlet opening 33 and an outlet opening 36. An arcuately shaped inlet duct 38 is disposed in juxtaposition to the rear wall 30 along one side thereof. The duct has an inlet opening 40 for receiving outside air and an outlet 42 above the water container inlet 33 for preventing suds back-up from the water container into the inlet duct 38. An intermediate baffle (not shown) in the duct 38 prevents communication of the water container inlet 33 with the interior of the duct 38 except by way of the elevated duct outlet 42. Disposed within the inlet duct 38 is any conventional heating means such as a tubular sheathed heater 44. Thus air enters the appliance by way of the duct inlet 40 and is warmed as it passes over the heater 44 before entering the water container 14. The heated air which flows into the water container from the inlet 33 circulates through the perforated walls of the drum 34 and flexes and encompasses the clothes tumbling in its path. Moisture is vaporized from the clothes and this moisture laden air is then withdrawn through the outlet opening 36 by a blower shown generally at 48 and having an inlet connected to said water container outlet 36 and a blower discharge 52. The blower is adapted through a flexible connection 50 to be connected with the atmosphere through one of the side walls of the casing 12 as at 54.

The foregoing air flow defining structure may be modified in that the combination washer-dryer will operate on either gas or electricity. For gas combustion, the electric element 44 is removed and a gas combustion chamber positioned in the lower left corner of the appliance (FIGURE 1) with the combustion chamber outlet connected to the duct inlet 40. Further a lint collecting arrangement may be provided by connecting the water container 14 through its cylindrical wall with a lint collector housing in the upper right corner of the appliance—the outlet of the lint collecting housing then communicating with the blower inlet 36. For cleaning the lint collector an access opening may be provided in the top wall of the appliance.

Water is supplied to the water container through a mixing valve 56 which has a hot water inlet 58 and a cold water inlet 60. Valve 56 supplies fill tube 62 in spaced air-gap relationship to the outlet 64 of the water valve 56. Thus in accordance with a timer shown generally at 68 the valve 56 is energized to supply a predetermined temperature water to the washer container 14. Since the tumbling drum 34 is perforated, water placed within the water container 14 will serve to inundate any fabric or clothing placed within the tumbling drum. For removing water from the water container 14 a drain outlet 70 is provided at the bottom thereof. A flexible conduit 72 connects the water container outlet 70 with a drain pump (not shown), the outlet 74 of which is connected to any conventional drain.

For rotating the tumbling drum 34 and actuating the blower 48 a prime mover system shown generally at 78 is carried on a bracket 80 fastened as by welding to the cylindrical wall of the water container 14. In general the prime mover 78 consists of a transmission portion 82 and a single speed unidirectional induction motor portion 84.

The prime mover 78 is fastened to the water container 14 in the lower right corner of the cabinet 12 (FIGURE 1). For this purpose the bracket 80 is provided with bent-up motor mounting leg portions 88 at the transmission end of the prime mover and leg 90 at the motor end of the prime mover system (FIGURE 3). For effecting vibrationless operation the motor 84 is provided with a conventional rubber isolation mount 92 having a metal channel 94 which is cradled in a generally U-shaped steel band 96 hooked at its terminal ends as at 97 to the mounting bracket leg 90. At the opposite end of the prime mover the mounting bracket leg 88 is provided with a pivot pin 98 fastened thereto by a nut and lock washer 99. The pin supports a rubber grommet 100 for vibration isolation—the grommet cushioning a notch or recess 101 in the transmission portion 82 of the prime mover. Above the pivot pin 98 an arcuate slot 102 is formed in the bracket leg 88. This slot slidably receives a mounting bolt 104 carried by a grommet 109 and a bracket 107 bolted at 106 to the end wall 126 of the transmission. Thus the prime mover 78 may be pivotally adjusted relative to the water container 14 to adjust the tension on the drum pulley belt 108. To mount the prime mover 78 relative to the water container 14 the transmission 82 is rested on the rubber grommet 100 and the rubber isolation mount 92 permitted to cradle in the steel support band 96 hooked to the bracket leg 90. The adjustment bolt 104 is then slidably positioned within the slot 102 of the bracket leg 88 and the belt 108 engages with the drum pulley 35 and a transmission drive pulley 140. When the desired tension on the belt 108 is achieved a nut may be used to tighten the bolt 104 against the bracket leg 88 to positively affix the prime mover assembly 78 in position—a lock washer 105 preventing loosening of the bolt 104. The prime mover assembly 78 will now be more fully described in connection with FIGURES 2, 3 and 4. A generally imperforate cup-shaped transmission housing 118 is designed to form a gear box and oil chamber 120. Intermediate the ends of the prime mover assembly 78 is a motor end bell plate 110 to which the motor 84 is mounted. The motor is adapted to rotate a power shaft 112 having a pump drive portion 114 for driving the water pump and a pinion portion 116 extending into the transmission housing 118. The power shaft 112 is journalled on a babbitt bearing 122 and has a conventional oil seal 124 circumscribing the shaft to prevent egress of oil from the transmission housing into the motor 84. The transmission housing 118 is formed with an end face 126 in which is formed the vibration support recess 101 and the tapped hole for receiving the mounting bolt 106. For attaching the housing 118 to the motor end bell 110 a plurality of fastening screws and lock washers such as 128 are utilized. In accordance with conventional practice an oil breather tube may be inserted through the wall of the transmission housing 118 to provide for expansion and contraction of the oil stored therein.

The prime mover system 78 is adapted to rotate the tumbling drum 34 at a high speed of approximately 360 r.p.m. when spinning the clothes to centrifuge the water therefrom and to rotate the tumbling drum 34 in the same direction at a slower speed of approximately 51 r.p.m., to tumble the clothes in the water contained by the water container 14. For this purpose a driven shaft 130 is journalled at one end in a babbitt bearing 132 in the motor end bell and at the other end thereof by a needle bearing 134 in the end face 126 of the transmission housing 118. As with the power shaft 112 a conventional oil seal 136 is installed to prevent egress of oil from the chamber 120 along the driven shaft 130. An oil plug 138 is disposed in the driven shaft port in the motor end bell to prevent the escape of oil from the direction. The drive pulley 140 is affixed to the outer end of the driven shaft 130 where it receives the drum pulley belt 108. To prevent the shaft 130 from pulling out of the transmission housing 118, a thrust washer or retainer 142 is snapped into an annular groove in the shaft 130.

Within the transmission housing a plurality of gears are disposed for securing low speed drum rotation for tumbling and high speed drum rotation for spin. More particularly a metallic tumble gear 146 having its teeth enmeshed with the pinion 116 is relatively rotatably mounted on the driven shaft 130 and includes a hub portion 148. In juxtaposition to the tumble gear 146 is a spin driven gear 150 which has a hub portion 152 adjacent to the tumble gear hub 148. The spin driven gear 150 is keyed as at 154 to the shaft 130 for rotation therewith. In spaced parallel coplanar relationship to the spin driven gear 150 is the spin driver gear 156 which is enmeshed with the helical gear teeth of the spin driven gear 150. The spin driver is relatively rotatably carried on the power shaft 112 and includes a hub portion 158. Both the spin driven gear 150 and the spin driver gear 156 may be formed of plastic or other similar material for quietness of operation. Coaxial with the spin driver 156 on the power shaft 112 is an annular clutch torque hub 160 which includes a transverse slot 162 for receiving a key or pin 164 extending through the power shaft 112. Thus the clutch torque hub 160 is keyed for rotation with the power shaft 112. Next on the stack-up on the power shaft 112 is an anti-back up cam 166 which is relatively rotatably carried on the power shaft and in juxtaposition to a pinion thrust washer 168. The entire stack-up on the power shaft is held in place by a motor shaft retaining ring 170.

The control for selecting either a tumble operation (drum 34 rotates at 51 r.p.m.) or a spin operation (drum 34 rotates at 360 r.p.m.) is best seen in FIGURE 4. In general a solenoid actuated pin 186 is selectively insertable through the transmission housing 118 where it may engage or disengage the anti-back up cam 166. When the solenoid 188 is deenergized the pin 186 is in and the transmission conditioned for tumble. When the solenoid is energized, the pin 186 is withdrawn and the transmission conditioned for spin. More particularly (FIGURE 4), the outer laminations 190, 192 of the armature 194 are extended to form an attachment for the selector pin 186—a roll pin 196 inserting through the laminations 190 and 192 and a port in the outer shaft end of the selector pin 186. Note that the anti-back up cam is formed with notches 198 for receiving the pin 186 when the solenoid 188 is deenergized. To insure that the pin 186 is forced inwardly a U-shaped spring steel band 200 bears against the roll pin 196 to force the pin inwardly whenever the solenoid 188 is deenergized. Lubrication openings 202 are also formed in the anti-back up cam to permit lubrication of the clutch torque hub 160 adjacent the anti-back up cam 166.

The driving system through the transmission 82 is such that the power shaft 112 operates in a clockwise direction at 1750 r.p.m. as viewed from the end face 126 of the transmission housing. In conjunction with the speed selector pin 186 for selectively obtaining high speed spin or low speed tumble a pair of clutch springs 174, 180 are included in the transmission for selectively inter-locking certain of the gears 146, 150 and 156 depending on whether the pin 186 is in or out. More particularly, a right hand wound torque spring 174, referred to as a tumble spring, is concentrically carried in overlying relationship to the gear hub portions 148 and 152. When viewed from the left hand end of the transmission (FIGURE 3) the tumble gear 146 will be rotated counter-clockwise by the pinion portion 116 and such counter-clockwise rotation will cause the tumble clutch spring 174 to wrap up or tighten on the hub portions 148 and 152. Thus the spin driven gear 150 will be rotated along with the tumble gear 146. Since the driven shaft 130 is keyed to the spin driven gear 150 the affixed pulley 140 will be operated to rotate the tumbling drum 34 at its slow speed. A speed reduction is achieved from the small pinion 116, through the large tumble gear 146, the small drive pulley 140 and the large drum pulley 35 to achieve a speed reduction from the 1750 r.p.m. motor speed to approximately a 51 r.p.m. low speed tumble.

When it is desired to centrifuge the water from the fabric, the solenoid 188 is energized and the pin 186 withdrawn so that the tumbling drum 34 is rotated at high speed. For this purpose a left-hand wound torque spring 180 referred to as a spin spring is installed in circumscribing closely overlying relationship to the hub portion 158 of the spin driven 156 and the clutch torque hub 160. A tang 182 on the clutch spring 180 projects through a port 184 on the anti-back up cam 166. With reference to FIGURE 4 it is seen that the anti-back up cam 166 is selectively arrested by the selector pin 186 which is actuated by the solenoid 188. Whenever the solenoid 188 is energized the pin 186 is withdrawn from the notch 198 and the anti-back up cam 166 is free to rotate with the pinion portion 116 of the power shaft 112. As soon as the cam 166 is released, its relaxing effect on the spin spring 180 is negated and the spring will tighten and lock the clutch torque hub 160 to the spin driver hub 158. In this relationship the drive through the transmission will be from the pinion 116 through the keyed clutch torque hub 160 and the spin clutch spring 180 to the spin driver 156. Since the spin driver 156 is enmeshed with the spin driven gear 150, the driven shaft 130 will be rotated through a one to one ratio at motor speed, namely 1750 r.p.m., and the tumbling drum 34 will be rotated in a high speed spin at approximately 360 r.p.m.

If, however, the solenoid 188 is deenergized to set up a tumble speed, the pin 186 will be forced inwardly by the U-shaped spring 200 into engagement with one of the anti-back up cam notches 198. This will arrest the rotation of the anti-back up cam and provide a drag force on the tang 182 of the spin spring 180 to relax the spring. As the spin clutch spring 180 unwinds the driving engagement between the clutch torque hub 160 and the spin driver 156 is released and the pinion 116 will drive through the tumble gear 146, the tightened tumble spring 174 and the shaft keyed spin driven gear 150 to produce a slow speed rotation of the drive pulley 140 and the tumbling drum 34.

In prior art devices clutch springs have been used in which a clutch spring tang has been biased to get the proper speed reduction with a unidirectional drive from the power shaft. However, in combination washer-dryer at the conclusion of a centrifuging operation or high speed spin, it is possible for the clothes to be disposed on the cylindrical drum wall away from the lowermost part of the tumbling drum. In this situation it is possible for the normal rotation of the tumbling drum 34 to be reversed as the heavy mass of fabric tends to seek its lowest level. Thus the drum pulley 35 will become a driver and will reversely rotate the drive pulley 140. Without the anti-back up cam of this invention such reverse relative rotation would cause the tang 182 of the spring 180 to move away from its relaxation inducing biasing agent and a subsequent tumble would attempt to start through the transmission in spin ratio. The tremendous effort required to rotate a loaded tumbling drum 34 from a dead start would result in the motor 84 cycling off on overload. At this point it should be understood that in the subject combination washer-dryer 10 the timer 68 is designed to start all drum rotation, spin or tumble, in a low speed ratio, i.e., the tumbling drum 34 is first rotated for a period at approximately 50 r.p.m. before the solenoid 188 is energized (in the case of spin) to withdraw the pin and allow the transmission to be conditioned for high speed drum rotation. Thus it is to the solution of this inadvertent lock up of the clutch torque hub 160 and the spin driver hub 158 through the spin spring 180 that the present invention is directed.

With reference to FIGURE 6 the anti-back up cam 166 is provided with the notch 198 in which the leading edge 210 is formed at an angle A of approximately nine degrees to permit easy withdrawal of the selector pin 186. With this arrangement and referring to FIGURES 3 and 4, let us assume that the prime mover system 78 is conditioned with the solenoid energized to produce a centrifuging or spin cycle. The power shaft 112 will be operating at the 1750 r.p.m. motor speed and the pin 164 will be driving the clutch torque hub 160. Since the solenoid has withdrawn the selector pin 186 the clockwise rotation of the power shaft will tend to wrap up the spin spring 180 and the drive pulley will be driven through the spin driver 156 and the spin driven gear 150 which is keyed to the driven shaft 130. After the water has been centrifuged from the clothing for a predetermined time in accordance with the timer 68, the motor 84 and the solenoid 188 will be deenergized and the tumbling drum 34 will decelerate or coast to a stop. If, when the drum 34 comes to a stop, the clothing within the drum is disposed on the drum wall beyond the lowest point of the drum, the drum 34 will reverse and this reverse rotation working through the transmission, will attempt to rotate the anti-back up cam 166 in a counter-clockwise direction (FIGURE 4). But with the notch sidewall 210 bearing against the side of pin 186, the cam 166 cannot move away from the pin. In effect this keeps the spin spring 180 in a relaxed condition so that a subsequent tumble operation will start in low speed, i.e., the power shaft 112 will drive the drive pulley 140 through the pinion portion 116, the tumble gear 146, the tumble spring 174 and the shaft-keyed spin driven gear 150.

Another facet of this invention pertains to the utilization of the prime mover system 78 for operating the air circulation system. In view of the space limitation in combination washer-dryers it is convenient to mount the blower 48 remote from the prime mover 78 as seen in FIGURE 1. In order to provide for selective energization of the blower 48 the impeller (not shown) is provided with an impeller driven pulley 214. Disposed in coplanar spaced relationship to the impeller driven pulley 214 is an impeller drive or power take-off pulley 216. The impeller drive pulley 216 is provided with a hub portion 218 (FIGURE 5) on which a ring of frictional tread material 220 is tightly fitted. The pulley hub 218 is hollow to receive a babbitt bearing 219 through which a pulley shaft 226 extends. One end 222 of a drive pulley lever 224 is affixed to the shaft 226 about which the drive pulley 216 is free to rotate. The lever 224 is pivoted to the back wall 30 of the water container 14 as at 227. The opposite end 228 of the lever is fastened to an impeller actuator solenoid 230 which is selectively energized through the timer 68 whenever it it desired to circulate air through the tumbling drum during the drying cycle. When the solenoid 230 is energized the tread portion 220 on the drive pulley hub 218 is pivoted into engagement with an annular ramp 232 disposed radially outwardly of and integral with the drum pulley 35. It should be understood that impeller or blower speed will depend upon the proper selection of sizes for the impeller drive pulley 216 and the impeller driven pulley 214, considering of course the periphery velocity of the drum pulley 35. When the solenoid 230 is energized along with the drum pulley the blower 48 will be actuated to draw air through the tumbling drum by way of the air inlet 40, the duct 38, the water container 14 and the water container outlet 36, so that the air may be discharged through the blower outlet connection 54 to the atmosphere.

It should now be seen that an improved prime mover system has been provided for a combination washer-dryer which includes a transmission for operating a tumbling drum directly and an air system impeller indirectly. Further, the transmission includes an anti-back up safety arrangement for insuring that the prime mover system is conditioned to accelerate from a dead start only in the low speed tumble speed ratio.

While the embodiments of the present invention as herein disclosed, constitute preferred forms, it is to be understood that other forms might be adopted.

What is claimed is as follows:

1. In a combination washer-dryer, means forming a casing, means for mounting said casing means for unbalance responsive movement in horizontal and vertical directions, a tumbling drum horizontally rotatably mounted within said casing means for unbalance responsive movement therewith and having a drum pulley outside of said casing means and journalled therein, said drum pulley having an annular groove and a radially outwardly disposed peripheral ramp, means including a belt in said groove for rotating said drum pulley to rotate said tumbling drum throughout washing and drying cycles, and air impelling means for inducing an air flow through said tumbling drum during said drying cycle and supported on said casing means for movement therewith, said air impelling means having an inlet connected to said casing means and an outlet connected to the atmosphere, said air impelling means having means for taking power from said means to rotate said tumbling drum, said power taking means including an impeller pulley mounted for rotation about an axis, drive pulley means for said impeller pulley rotatably mounted on a shaft in spaced parallel relationship to the axis of said impeller pulley and having a tread portion coplanar with said ramp on said drum pulley, a lever pivotally supported at an intermediate portion thereof on said casing means for pivotally mounting the shaft of said drive pulley means at one end thereof for pivotal movement of said drive pulley means relative to said drum pulley, and solenoid means supported on said casing means and connected to said lever at the other end thereof for selectively pivoting the tread portion of said drive pulley means into power take-off engagement with said ramp for rotating said impeller pulley in response to the rotation of said drum pulley.

2. In combination, support means, means for mounting said support means for unbalance responsive movement in horizontal and vertical directions, a tumbling drum horizontally rotatably mounted on said support means for unbalance responsive movement therewith and having a drum pulley journaled in said support means, said drum pulley having an annular driven portion and a radially outwardly disposed peripheral ramp, means connected to said driven portion for rotating said drum pulley to rotate said tumbling drum, and air impelling means for inducing an air flow through said tumbling drum and supported for movement with said support means, said air impelling means having an inlet connected to said support means and an outlet connected to the atmosphere, said air impelling means having means for taking power from said means to rotate said tumbling drum, said power taking means including an impeller pulley mounted for rotation about an axis, drive pulley means for said impeller pulley rotatably mounted on a shaft in spaced parallel relationship to the axis of said impeller pulley and having a tread portion coplanar with said ramp on said drum pulley, a lever pivotally supported for movement with said support means for pivotally mounting the shaft of said drive pulley means at one end thereof for pivotal movement of said drive pulley means relative to said drum pulley, and means supported for movement with said support means and connected to said lever at the other end thereof for selectively pivoting the tread portion of said drive pulley means into power take-off engagement with said ramp for rotating said impeller pulley in response to the rotation of said drum pulley.

References Cited by the Examiner

UNITED STATES PATENTS

| 2,424,737 | 7/1947 | Broglie | 34—133 |
| 2,477,949 | 8/1949 | Amonsen | 34—133 |
| 2,587,646 | 3/1952 | O'Neil | 34—133 |
| 2,978,232 | 4/1961 | Kruzan | 34—133 |

FOREIGN PATENTS 1,217,144  12/1959  France.

WILLIAM F. O'DEA, Acting Primary Examiner.

NORMAN YUDKOFF, ROBERT A. O'LEARY,
*Examiners.*